June 24, 1958
H. M. RICHTER
2,840,102
REPLACEMENT UNIT VALVE DEVICE, ADAPTED
FOR USE IN FAUCETS, OR THE LIKE
Filed Aug. 11, 1954
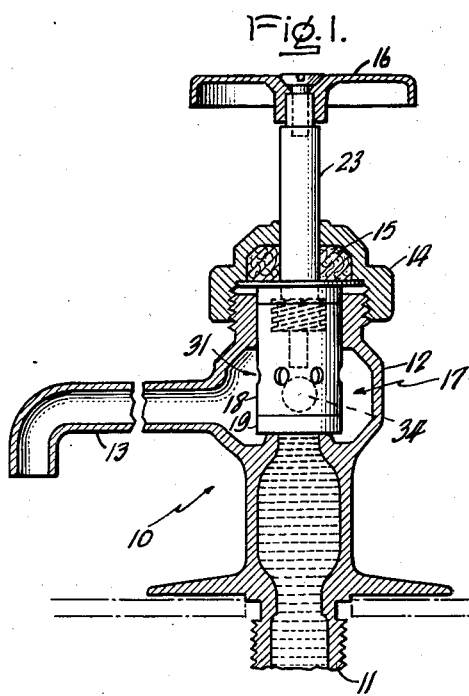
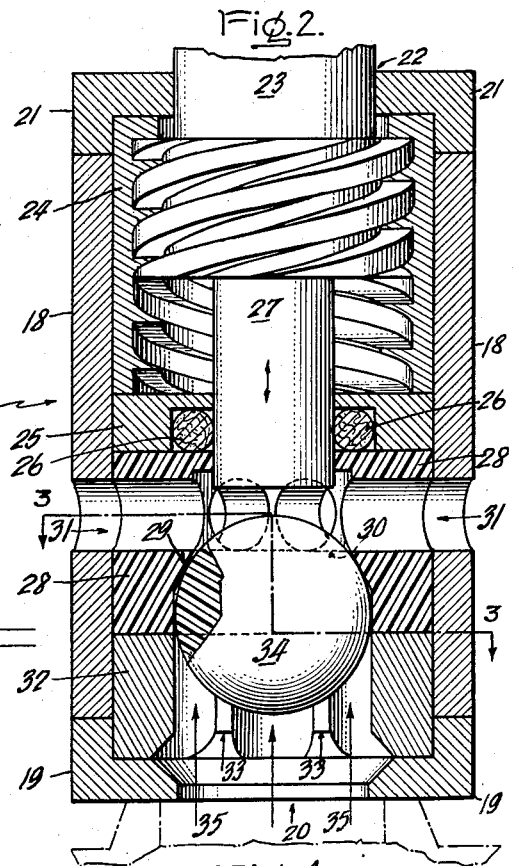
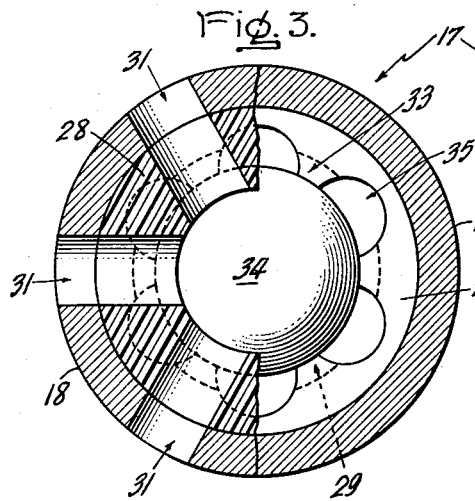
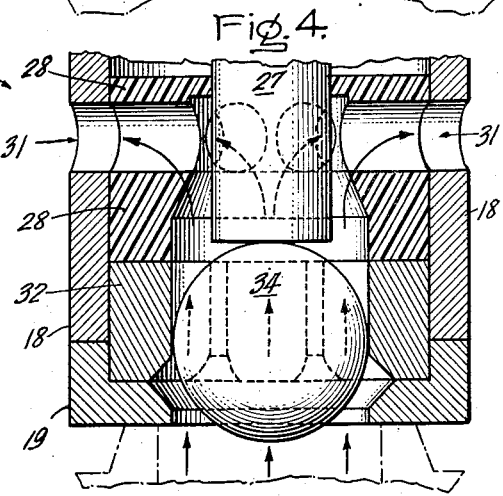
Inventor:
Herbert M. Richter,
by Andros and Smith
His Attorneys.

2,840,102
REPLACEMENT UNIT VALVE DEVICE, ADAPTED FOR USE IN FAUCETS, OR THE LIKE

Herbert M. Richter, North Bergen, N. J.

Application August 11, 1954, Serial No. 449,185

1 Claim. (Cl. 137—454.6)

This invention has to do with valves, or valve devices, having particular reference to a valve device comprising a replacement unit adapted for use in standard types of water faucets, and the provision of such a device is a principal object of the invention.

It is well known that such standard conventional types of water faucets have a tendency to leak and become noisy because the washers soon become worn and need replacement. This is a costly and time-consuming procedure, especially in large apartment houses and hotels, to say nothing of the average home.

It has long been felt in the industry that it would be a distinct improvement to overcome the foregoing difficulties and disadvantages, and this has now been accomplished by means of the present invention.

Generally, therefore, it is an object of the present invention to provide a valve device as a replacement until for present day faucets, as well as faucets provided therewith, that is simple, yet sturdy and durable of construction, economic of manufacture, will operate with relative freedom from wear and tear as well as other mechanical difficulties, which is relatively noiseless and has lifelong characteristics.

More specifically, it is an object of the invention to provide a valve control device for use in a valve for passing fluids therethrough comprising a casing having a fluid inlet at one end, and a valve-stem inlet at the other end, and, sealed or substantially enclosed within the confines of said casing, a valve-stem passing through the valve-stem inlet, an apertured valve-disk having a valve-seat penetrable by the stem, at least one lateral passageway through the casing communicating with the aperture in the valve-disk and the fluid inlet, and a valve element for the valve-seat movable in one direction by the stem when actuated against the element to push it away from the seat to allow fluid to flow through the valve, and in an opposite direction, by fluid pressure, against the seat when the stem is moved away from the element in order to check the flow of fluid from the faucet.

Yet more specifically, it is an object of the invention to provide such a valve device comprising a replacement unit adapted for use in a faucet, the device constituting a cylindrical casing, a water-cap at one end of the casing having a hole therethrough for the flow of water, a stem-cap at the other end of the casing having a hole therethrough for a valve-stem, and including the following structures sealed within the confines of the casing: a valve-stem passing through the hole in the stem-cap; an apertured valve-disk having a valve seat penetrable by the stem; at least one lateral passageway through the valve-disk, and the casing, communicating with the aperture therein; a guide sleeve between the valve-disk and water-cap, having spaced-apart, vertically arranged guideways for a ball-valve, and providing passageways for the flow of water therebetween and the ball-valve, through the valve-seat, lateral passageway and faucet; and a freely rotatable ball-valve for the valve-seat, reciprocably actuatable in one direction along the guideways by the valve-stem when the latter is actuated against the ball to move it away from the seat to allow water to flow through the faucet and in an opposite direction by water pressure against the seat when the stem is actuated away from the ball so that the water flowing from the faucet can be shut off.

Other specific objects of the invention are to provide such a valve device in which preferably both the valve-disk and ball are made of a light weight material, characterized by having a specific gravity slightly in excess of that of water, high resistance to erosion and abrasion, and immune to corrosion, such as, for example, a plastic material, preferably made of nylon, or other suitable equivalent material.

Other specific objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claim.

For a fuller understanding of the nature and objects of the invention reference should be had to the following detailed description taken in connection with the accompanying drawing, in which:

Fig. 1 is a vertical sectional view illustrating a standard conventional type of water or other faucet having a valve device illustrating a replacement unit assembled therein of the preferred type embodied by the invention;

Fig. 2 is a vertical sectional view, substantially enlarged for illustrative purposes with parts broken away, of the replacement unit depicted in Fig. 1 illustrating the valve in closed position;

Fig. 3 is a sectional view taken along the lines 3—3 of Fig. 2 and looking in the direction of the arrows; and Fig. 4 is a fragmentary sectional view of the lower half of the replacement unit shown in Fig. 2 and illustrating the valve in opened position.

Referring more particularly to the drawing, there is shown generally at 10 a standard conventional washer type of faucet having a water inlet pipe 11, a water jacket 12, a water outlet spout 13, a bonnet 14 with conventional packing 15 therein and a valve-stem handle 16 for opening and closing the faucet.

The replacement unit is indicated generally at 17 and preferably constitutes a cylindrical casing 18 having a water-cap 19 at one end thereof with a hole therethrough as indicated at 20 for the upward flow of water as shown by the arrows. A stem-cap 21 is located at the other end of the casing and has a hole therethrough as indicated at 22 for a valve-stem 23.

The cylindrical casing preferably is press-fitted around the operating structures or mechanism of the device which consequently are sealed within the confines of the casing. Such structures or operating mechanism preferably include an internally threaded bushing 24 adjacent or in abutting relation with the stem-cap 21. Below the bushing and preferably abutting the same is a recessed, annular retaining disk 25 having a resilient O-ring 26 seated within the recess of the disk and surrounding an opening therein.

The valve-stem 23 projects through the hole 22 in the stem-cap 21 and, within the casing has a threaded stem portion 27, with the thread thereon in operative engagement with the threaded bushing, the stem portion below its thread passing through the retaining disk 25 and through the O-ring 26, being embraced by the latter whereby leakage is prevented.

An apertured valve-disk 28 preferably abuts the recessed disk 25 and has a tapered or chamfered valve-seat 29 and opening 31 therethrough which is penetrable by the valve-stem portion 27. The valve-disk has at least one lateral passageway, but preferably a plurality of radial passageways therethrough and through said casing as indicated at 31 which communicate with the aperture 30 therein.

A guide sleeve 32 is located between the valve-disk 28 and the water-cap 19 preferably having spaced-apart, vertically arranged guideways 33 for a ball-valve 34 and provides passageways 35 for the flow of water therebetween and between the ball-valve through the valve-seat, radial passageways and spout of the faucet.

The valve-disk 28 and the ball-valve 34 preferably are made of nylon, or other equivalent material, having the characteristics herein specified.

The ball-valve 34 is freely rotatably and reciprocably actuatable in one direction along the guideways by the valve-stem portion 27 to allow water to flow through the faucet because downward movement of the stem pushes the ball away from the seat 29 whereby the water, being under pressure, rushes past the ball through the passageways 35 and 31 into the jacket 12 of the faucet and out of the spout 13. When the stem 27 is retracted, the water pressure causes the ball to rise upwardly immediately along the guideways 33 to become seated against the valve-seat 29, thereby checking the flow of water from the faucet.

Replacement of such a unit in conventional faucets is a very simple matter and can be performed by anyone by simply removing the bonnet 14 from the faucet and the handle 16 from the old valve-stem, and discarding the latter. The new replacement unit is then inserted in the faucet as shown in Fig. 1, the bonnet repositioned and the handle 16 transferred to the exposed portion of the stem.

It will thus be seen that the objects hereinbefore set forth may readily and efficiently be attained, and since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

In a valve device, comprising a replacement unit adapted for use in a faucet, said device constituting a cylindrical casing; a water-cap at one end of said casing, having a hole therethrough for the flow of water into said casing; a stem-cap at the other end of said casing, having a hole therethrough for a valve-stem; and including the following structure sealed within the confines of said casing: an internally threaded bushing adjacent said stem-cap; a recessed, annular retaining disk; a resilient O-ring seated within said recessed disk; a valve-stem projecting through the hole in said stem-cap, and having a threaded stem portion in engagement with said threaded bushing, passing through said disk and O-ring, and being embraced by the latter; an aperture valve-disk adjacent said recessed disk, having a valve-seat penetrable by said valve-stem portion; radial passageways through said valve-disk, and said casing, and communicating with the aperture therein; a guide sleeve, between said valve-disk and water-cap, having spaced-part, vertically arranged guideways for a ball-valve, and providing passageways for the flow of water therebetween and said ball-valve, through said valve-seat, radial passageways and faucet; and a freely rotatable ball-valve for said valve-seat, reciprocably actuatable in one direction along said guideways by said valve-stem portion when rotated to move said ball away from said seat to allow water to flow through said faucet, and in an opposite direction by water pressure against said seat when said stem portion is reversed, thereby to check the flow of water from said faucet.

References Cited in the file of this patent

UNITED STATES PATENTS

| | | |
|---|---|---|
| 557,720 | Teahen | Apr. 7, 1896 |
| 675,665 | McCanna | June 4, 1901 |
| 999,608 | Stucky | Aug. 1, 1911 |
| 1,071,271 | Spangler | Aug. 26, 1913 |
| 1,782,758 | Gravin | Nov. 25, 1930 |
| 1,848,261 | McIntyre | Mar. 8, 1932 |
| 2,508,843 | Semak | May 23, 1950 |
| 2,641,278 | Eplett | June 9, 1953 |
| 2,646,246 | Tucci | July 21, 1953 |
| 2,661,019 | Snyder | Dec. 1, 1953 |
| 2,783,773 | Rasch | Mar. 5, 1957 |

FOREIGN PATENTS

| | | |
|---|---|---|
| 473,756 | Italy | of 1952 |